(12) United States Patent
Kawano et al.

(10) Patent No.: US 7,181,061 B2
(45) Date of Patent: Feb. 20, 2007

(54) DIGITAL CAMERA FOR TAKING A STEREOSCOPIC PAIR OF IMAGES

(75) Inventors: Kiyoshi Kawano, Saitama-ken (JP); Tadayuki Kirigaya, Saitama-ken (JP); Hitoshi Uwabu, Ibaraki-ken (JP); Toshio Masuda, Tokyo (JP)

(73) Assignee: PENTAX Corporation, Tokyo (JP)

( * ) Notice: Subject to any disclaimer, the term of this patent is extended or adjusted under 35 U.S.C. 154(b) by 622 days.

(21) Appl. No.: 10/359,175

(22) Filed: Feb. 6, 2003

(65) Prior Publication Data
US 2003/0152263 A1 Aug. 14, 2003

(30) Foreign Application Priority Data
Feb. 13, 2002 (JP) .............................. 2002-035013

(51) Int. Cl.
G06K 9/00 (2006.01)
(52) U.S. Cl. ..................... 382/154; 348/42; 348/220.1; 382/284; 386/121; 396/324
(58) Field of Classification Search ................ 345/204, 345/547; 348/584, 626, 42, 220.1; 382/154, 382/284, 285; 386/121; 396/324
See application file for complete search history.

(56) References Cited

U.S. PATENT DOCUMENTS 6,335,728 B1 1/2002 Kida et al.
6,556,775 B1 * 4/2003 Shimada ..................... 386/121
6,771,319 B2 * 8/2004 Konuma ..................... 348/584
6,937,273 B1 * 8/2005 Loui ........................ 348/220.1
6,943,782 B2 * 9/2005 Tamura ..................... 345/204
2003/0152263 A1 * 8/2003 Kawano et al. ............. 382/154

FOREIGN PATENT DOCUMENTS

| EP | 1085769 | 3/2001 |
| GB | 2399184 A * | 9/2004 |
| JP | 2001-230955 | 8/2001 |
| JP | 2002-290780 | 10/2002 |
| JP | 2002-374542 | 12/2002 |

OTHER PUBLICATIONS

English Language Translation of JP Appln. No. 2001-230955.
English Language Translation of JP Appln. No. 2002-290780.
English Language Abstract of JP 2002-374542.

* cited by examiner

*Primary Examiner*—Gregory Desire
(74) *Attorney, Agent, or Firm*—Greenblum & Bernstein, P.L.C.

(57) ABSTRACT

The digital camera being capable of recording stereoscopic first and second still images includes an imaging device that captures the first and second still images in this order, a display unit that displays a moving image captured by the imaging device to allow framing an image to be taken. The display unit superimpose a framing assisting pattern on the moving image to facilitate the framing of the image to be taken. A grid pattern may be utilized as the framing assisting pattern. After the first still image is captured, the display unit displays the first still image, with the framing assisting pattern superimposed thereon, besides the moving image after said first still image is captured.

18 Claims, 8 Drawing Sheets

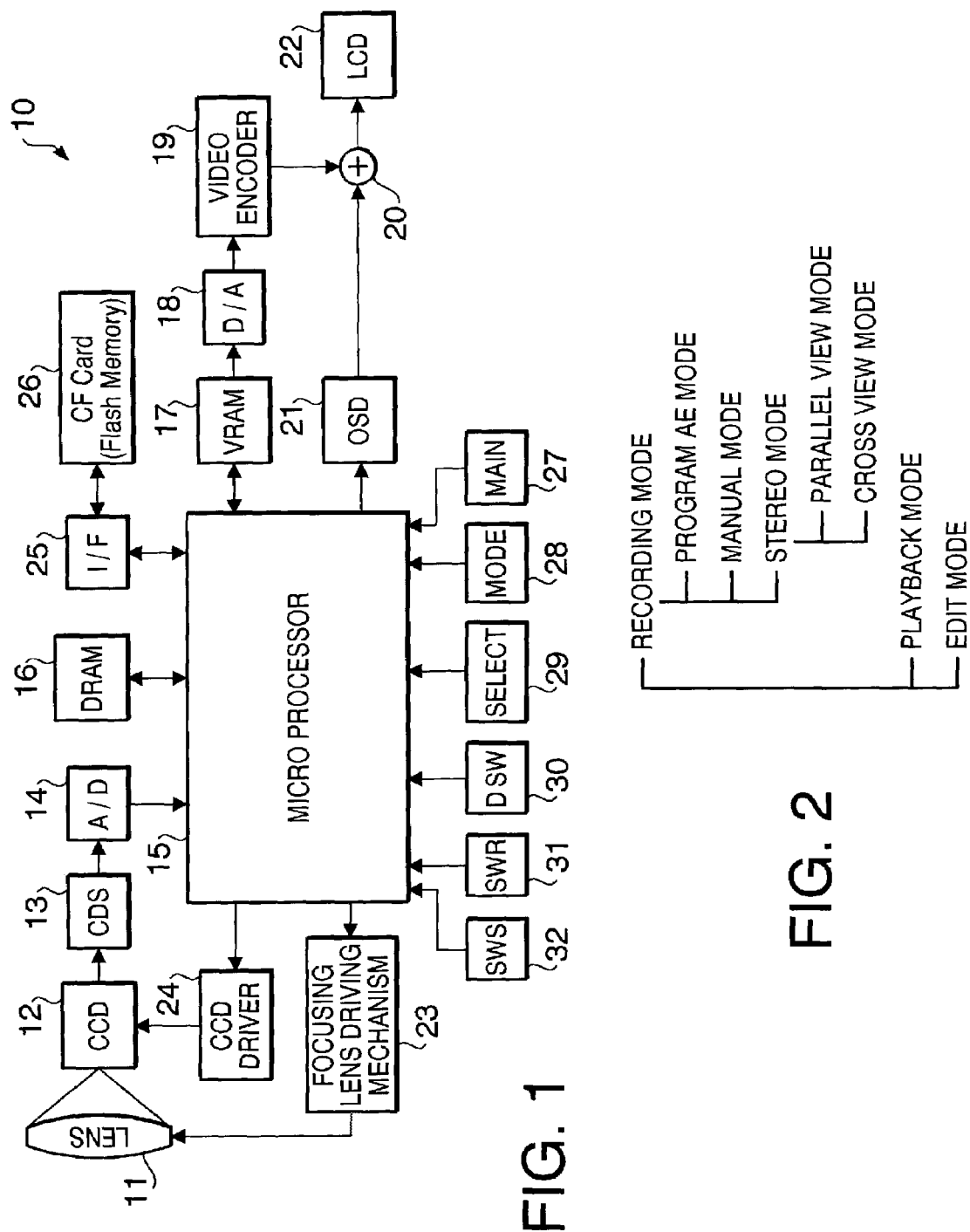

DIGITAL CAMERA FOR TAKING A STEREOSCOPIC PAIR OF IMAGES

BACKGROUND OF THE INVENTION

The present invention relates to a digital still camera, and in particular, to a digital still camera suitable for taking a stereoscopic pair of images.

A stereoscopic pair of images can be generated with a single digital camera by shooting a first still image of an object, then displacing the camera horizontally for an suitable distance, and then shooting a second still image of the same object.

In order to obtain a good stereoscopic effect from the pair of images taken as above, the framing of the second shoot should be adjusted to that of the first shoot. In conventional digital cameras, the framing of the image is typically performed by looking at a LCD monitor that shows a moving image currently captured by an imaging device such as a CCD.

The framing of the second still image, however, is difficult since the user has to remember the composition of the first still image and perform the framing of the second image by adjusting the image displayed on the LCD monitor as close as possible to that of the first image based on his/her memory. Therefore, there is a need for providing a digital camera that allows framing the second image of the stereoscopic pair of images without relying on the user's memory.

SUMMARY OF THE INVENTION

The present invention is advantageous in that a digital camera is provided that allows proper framing of the digital camera for taking a stereoscopic pair of images without relying on the user's memory.

According to an aspect of the invention, there is provided a digital camera for taking a stereoscopic pair of images of an object. The digital camera includes an imaging device for capturing the image of the object, a memory unit for storing a still image captured by the imaging device, and a display unit that simultaneously displays the still image stored in the memory unit, or the still image previously taken, and a moving image currently captured by the imaging device. The moving image is displayed beside the still image for allowing framing the image to be taken.

Since the still image previously taken is simultaneously displayed on the display unit, one can easily point the digital camera such that the object is located within the moving image at the same location as it is in the still image. By shooting the camera after framing the moving image as above, a still image can be obtained that provides a good stereoscopic effect together with the still image previously taken.

Optionally, the moving image and the still image are displayed side by side in a lateral direction of the display unit. Further optionally, the moving image and the still image are displayed in substantially the same size so that one can easily compare the still image and the moving image and thereby decide whether a proper framing is achieved or not.

In some embodiments of the invention, the display unit superimposes a framing assisting pattern on each of the moving image and the still image to facilitate the determination of the object's locations within the still image and the moving image. A grid pattern may be utilized as the framing assisting pattern that has at least one line parallel to top and bottom edges of the display unit and at least one line parallel to the side edges of the display unit. Such a grid pattern facilitates the detection of displacement and/or tilting between the objects within the two images simultaneously displayed.

According to another aspect of the invention, a digital camera is provided that is capable of taking stereoscopic first and second still images. The digital camera includes an imaging device that captures the first and second still images in this order, and a display unit that displays a moving image captured by the imaging device to allow framing an image to be taken. The display unit superimposes a framing assisting pattern on the moving image to facilitate the framing of the image to be taken. A grid pattern may be utilized as the framing assisting pattern.

After the first still image is captured, the display unit displays the first still image, with the framing assisting pattern superimposed thereon, besides the moving image.

In the digital camera configured as above, the framing assisting pattern is superimposed on the moving image not only during the framing of the second still image but also during the framing of the first still image. Accordingly, the user can carry out the first shoot by aiming at a distinctive part of the object with the framing assisting pattern, and then the second shoot by aiming again at the same part of the object with the same framing assisting pattern. As a result, a pair of still images providing a good stereoscopic effect can be obtained.

In some embodiments of the invention, the display unit has a screen which is longer in the lateral direction than in top and down direction. In such cases, two areas can be defined on the screen by dividing the screen in half along the lateral direction and the first still image is displayed on one of the two areas while the moving image is displayed on the other one of the two areas.

In some embodiments of the invention, the first still image is defined as a partial area of an image captured by the imaging device. In such cases, the display unit displays only an area of the moving image captured by the imaging device that corresponds to the first still image before said still image is taken. In this way, the digital camera facilitates the framing of the first still image.

Optionally, the digital camera has a memory device for storing the first and second still images thereinto. The first and second still images may be stored into the memory device as a single set of data for generating a picture suitable for observing a stereoscopic view by parallel view method. Alternatively, The first and second still images may be stored into the memory device as a single set of data for generating a picture suitable for observing a stereoscopic view by cross view method.

According to another aspect of the invention, a method for displaying images on a display unit of a digital camera is provided. The digital camera is adapted to take first and second images of an object in this order to generate a stereoscopic pair of images. The method includes displaying a moving image of the object on the display unit to allow framing an image to be taken, and additionally displaying the first still image besides the moving image after the first still image is taken.

BRIEF DESCRIPTION OF THE ACCOMPANYING DRAWINGS

FIG. 1 is a block diagram illustrating an electronic configuration of a digital camera according to an embodiment of the invention;

FIG. 2 illustrates a hierarchical structure of operating modes of the digital camera of FIG. 1;

Figure 5:
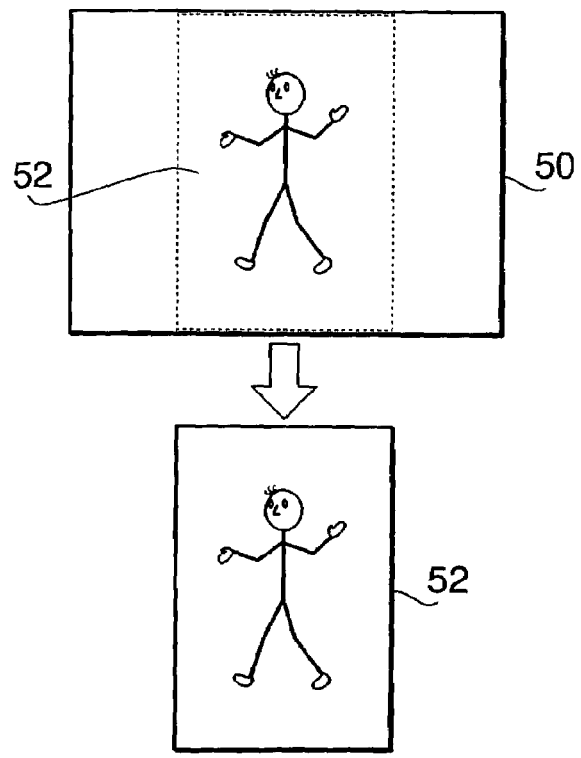
Figure 6:
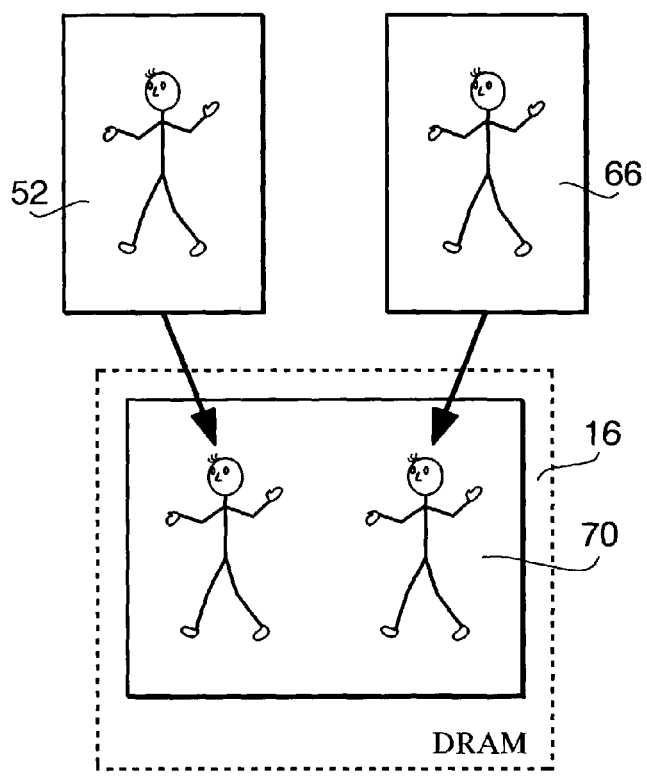
Figure 7:
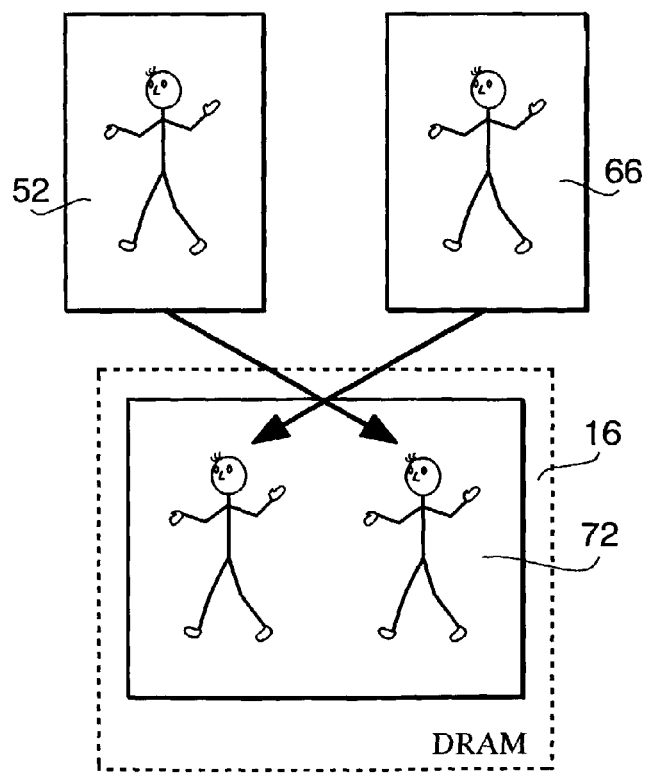

FIG. 5 schematically illustrates how a first stereo image is generated;

FIG. 6 schematically illustrates how a set of data of a stereoscopic image to be observed by parallel view method is generated; and FIG. 7 schematically illustrates how a set of data of a stereoscopic image to be observed by cross view method is generated.

DETAILED DESCRIPTION OF THE EMBODIMENTS

Hereinafter, an embodiment of the invention will be described with reference to the accompanying drawings.

FIG. 1 is a block diagram illustrating an electronic configuration of a digital camera according to the embodiment of the invention.

In the digital camera according to the present embodiment, a lens system 11 forms an optical image on a light receiving surface of a CCD 12 which is driven by a CCD driver 24. The pixels of the CCD 12 convert the optical image of the object into an analog electronic signal. The analog signal is sampled by a correlation double sampling circuit (CDS circuit) 13 and then converted into digital image signal by an A/D converter 14. Then, the digital image signal enters a microprocessor 15 which applies various processing to the image signal, such as color balancing and gamma correction, to generate digital data on the brightness and color of the image captured by the CCD 12.

The microprocessor stores the obtained digital image data into a memory such as a DRAM 16. The microprocessor 15 also saves, if required, the digital image data held in the DRAM 16 into a recording medium 26 via an interface 25. A memory card such as a compact flash (CF) card may be utilized as the recording medium 26.

The digital image data held in the DRAM 16 can be copied into a VRAM 17 to display the image on a monitor device such as an LCD monitor 22. The digital image data copied into the VRAM 17 is converted to an analog image signal by a D/A converter 18. Further, a video encoder 19 converts the analog image signal into a video signal and output it to an adder 20. The adder 20 mixes a video signal generated by an on-screen display (OSD) circuit 21 to the video signal from the video encoder 19 to superimpose characters, signs, graphic images, masking patterns, grid patterns and the like on the image captured by the CCD 12. The characters, signs and the like superimposed on the image as above may include various information on the camera such as shutter speed and f-numbers. The mixed video signal is sent to the LCD monitor 22 to display a moving image and/or a still image captured by the CCD 12.

The focusing of the lens system 11 is carried out by a focusing lens driving mechanism 23. The focusing lens driving mechanism 23 rotates a lead screw (not shown) by a pulse motor (not shown) and thereby drives a focusing lens of the lens system 11 along the optical axis thereof. The lens driving mechanism 23 is controlled by the microprocessor 15.

The microprocessor 15 is connected with a main switch 27, a mode selecting dial 28, a selecting switch 29, a determination switch 30, a release switch 31, and a photometry switch 32.

The main switch 27 is for changing the state of the digital camera 10 from a sleep mode to an ON mode or vice versa. The mode selecting dial 28 is for selecting the operating mode of the digital camera 10. In the digital camera 10 according to the present embodiment, a recording mode, a playback mode, and an edit mode can be selected by operating the mode selecting dial 28.

The recording mode has several sub-modes. When the recording mode is selected by the mode selecting dial 28, a menu for selecting the sub-mode will be displayed on the LCD monitor 22. The sub-mode can be selected by operating the selecting switch 29 and then pressing the determination switch 30 to confirm the selection.

The release switch 31 and the photometry switch 32 are configured such that the photometry switch 32 becomes ON by depressing a shutter button (not shown) halfway and the release switch 31 becomes ON when the shutter button is fully depressed. When the photometry switch 32 is ON, the digital camera 10 of the present embodiment performs photometry, and when the release switch is ON, the digital camera 10 carries out a shoot.

FIG. 2 illustrates a hierarchical structure of the operating modes of the digital camera 10 according to the embodiment. In the digital camera 10 according to the embodiment, one of the recording mode, the playback mode, and the edit mode can be selected by operating the mode selecting dial 28.

The recording mode includes several sub-modes such as program AE mode, manual mode, stereo mode, and the like. If the mode selecting dial 28 is adjusted to recording mode, the OSD circuit 21 generates a video signal to superimpose on the LCD monitor 22 one of the sub-modes of the recording mode. The sub-mode displayed on the LCD monitor 22 changes in sequence whenever the selecting switch 29 is pressed. The digital camera 10 begins to operate in the sub-mode currently displayed on the LCD monitor 22 if the determination switch 30 is pressed.

If the stereo mode is selected, the digital camera records two still images (which are taken one after another from two different locations so as to obtain a stereoscopic pair of images, i.e., a left image and a right image) in one frame such that the picture reproduced therefrom have one of the two still images at the left half and the other one at the right half.

The stereo mode has two sub-modes, i.e., parallel view mode and cross view mode. In the parallel view mode, the digital camera 10 records the stereoscopic pair of still images such that the left image becomes on the left half of the reproduced picture and the right image becomes on the right half. On the contrary, the stereoscopic pair of still images are recorded such that the left image becomes on the right half of the reproduced picture and the right image on the left half if the cross view method is selected. Note that, in the present embodiment, the still image obtained by the first shoot is defined as the left image and the still image obtained by the second shoot as the right image.

If the stereo mode is selected, the OSD circuit 21 generates signals for superimposing a menu on the LCD monitor 22 for selecting either the parallel view mode or the cross view mode. Selection can be carried out by operating the selecting switch 29 and then pressing the determination switch 30.

Figure 3A:
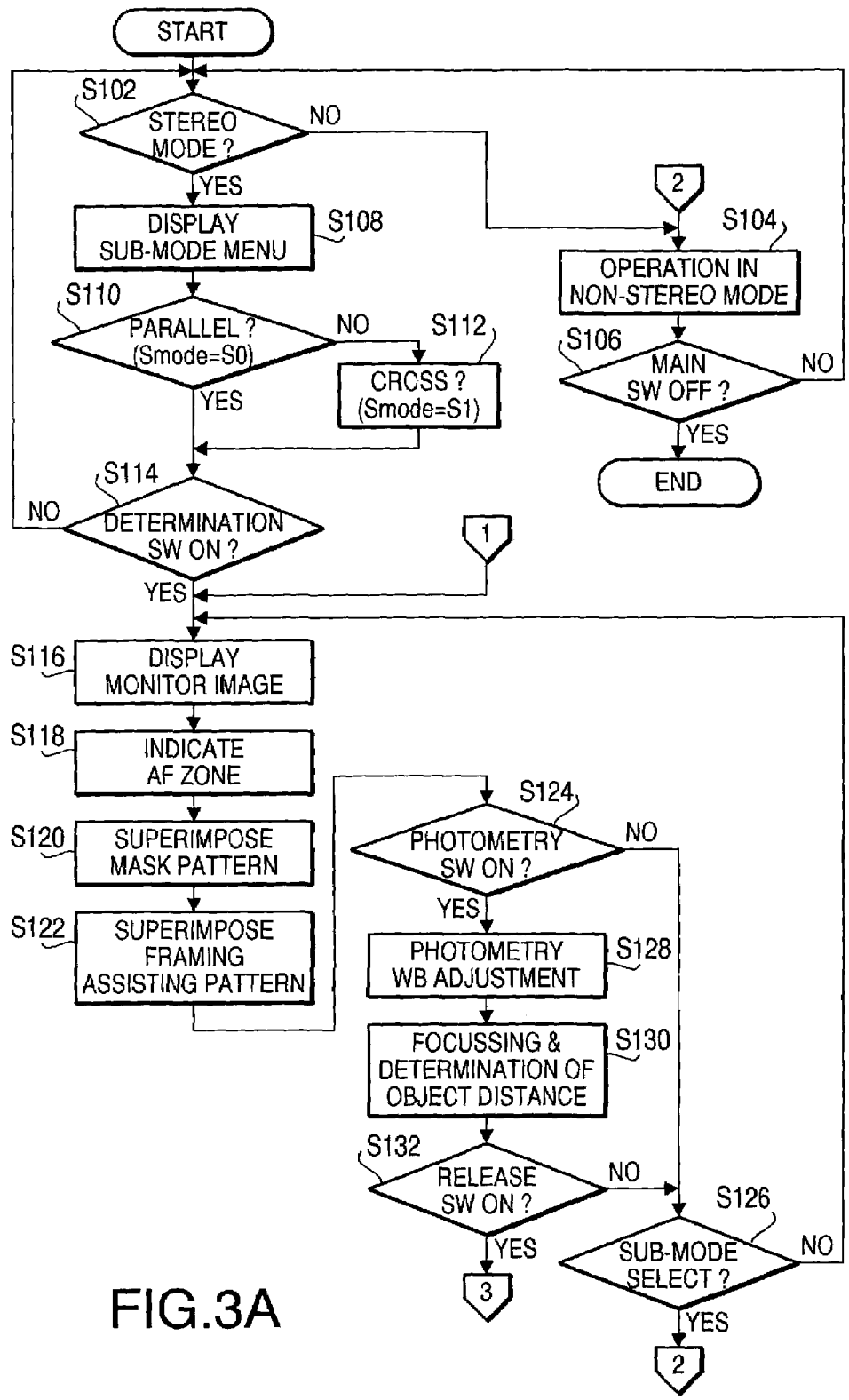
FIGS. 3A through 3C are flow charts showing a process carried out in the digital camera of FIG. 1.
Figure 3B:
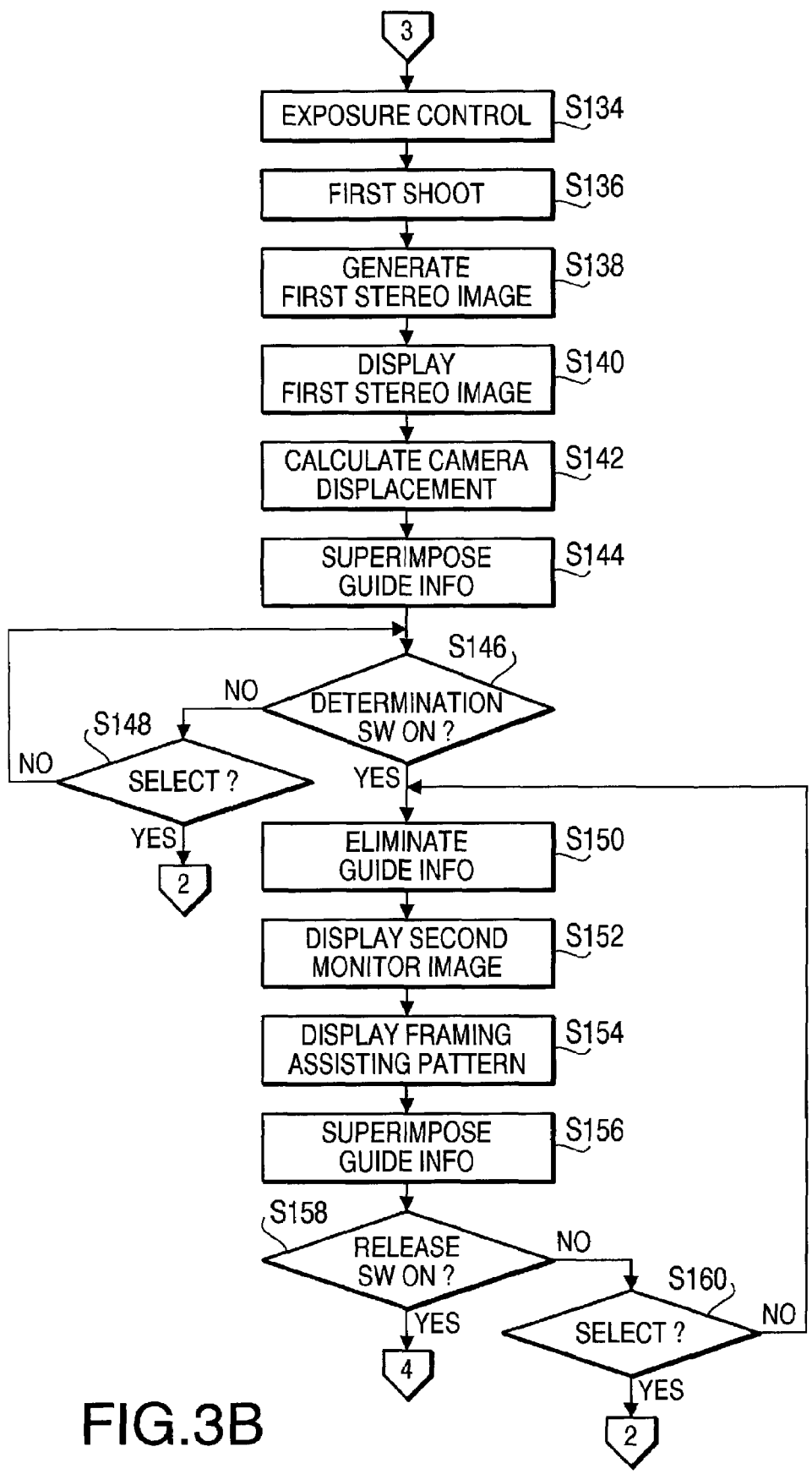
Figure 3C:
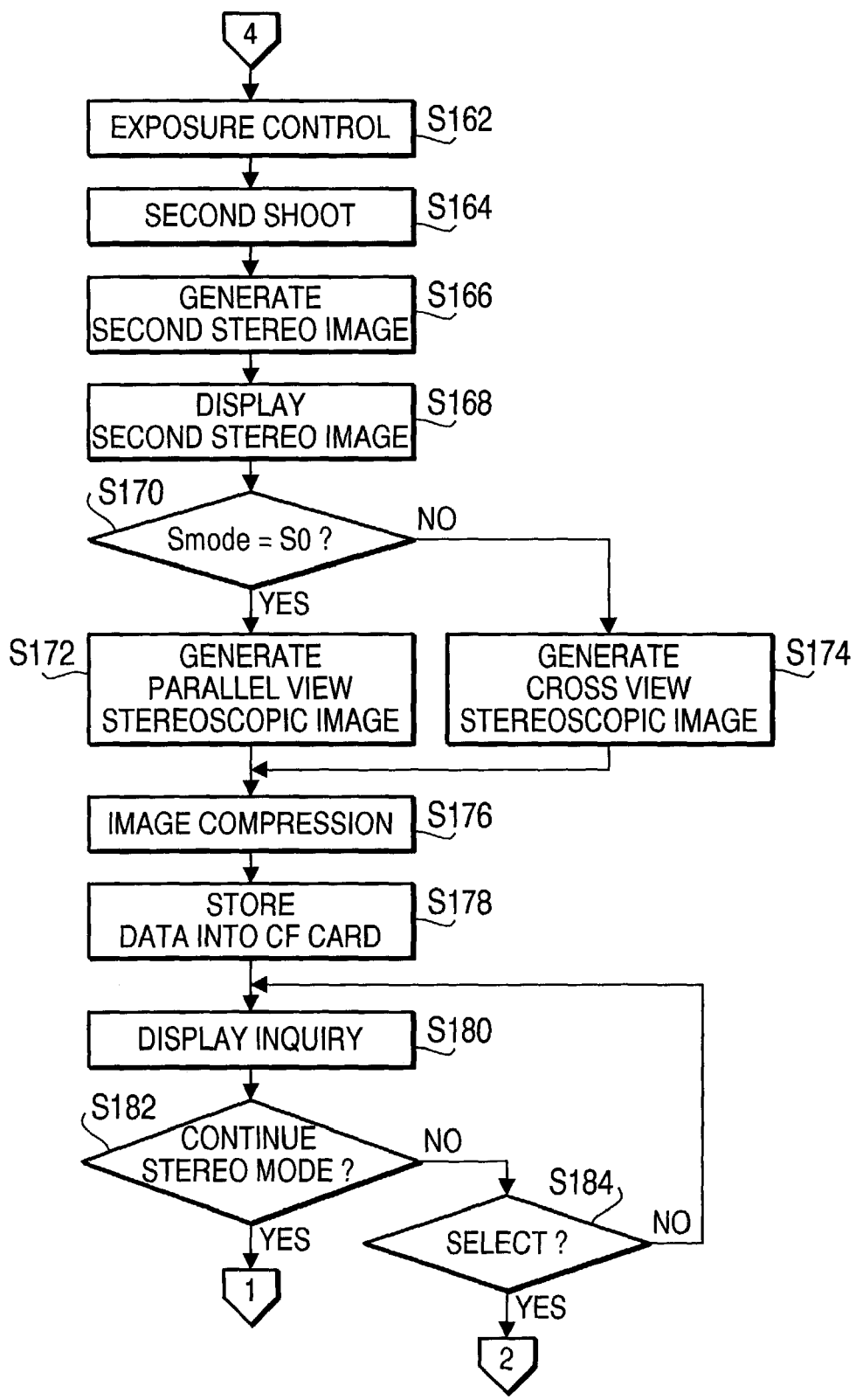

FIGS. 3A through 3C are flow charts showing a process carried out in the digital camera 10 according to the present embodiment when stereo mode is selected.

When the mode selecting dial 28 is set to recording mode and one of the sub-modes is selected, the digital camera 10 determines whether the stereo mode is currently selected or not (S102). If the stereo mode is not selected (S102:NO), the process proceeds to step S104 to operate the digital camera 10 in either the program AE mode or the manual mode, depending on the selection by the selecting switch 29. Then, it is determined whether the main switch 27 is OFF (S106). IF the main switch 27 is not OFF (S106:NO), the process returns to step S102, while the process terminates if the main switch 27 is OFF (S106:YES).

If the currently selected mode at step S102 is the stereo mode, a menu for selecting the stereo sub-mode, i.e., either the parallel view mode or the cross view mode, is superimposed on the LCD monitor 22 (S108). Note that the stereo sub-mode can be selected by operating the selecting switch 29.

Then, it is determined whether the parallel view mode is selected or not (S110). If the parallel view mode is currently selected (S110:YES), then "S0" is assigned to a variable Smode (S110), while "S1" is assigned to the variable Smode if the currently selected mode is the cross view mode (S110:NO, S112).

Next, it is determined whether the determination switch 30 is ON (S114). If it is not ON (S114:NO), the process returns to step S102 to repeat the steps S102 through S114 until the determination switch 30 is pressed.

If the determination switch 30 is ON at step S114, the process for capturing the first one of the stereoscopic pair of stills images, which will be referred to hereinafter as a first stereo image, will be carried out (steps S116 through S138). Note that, in the present embodiment, the first stereo image corresponds to the left image of the stereoscopic pair of images.

Figure 4A:
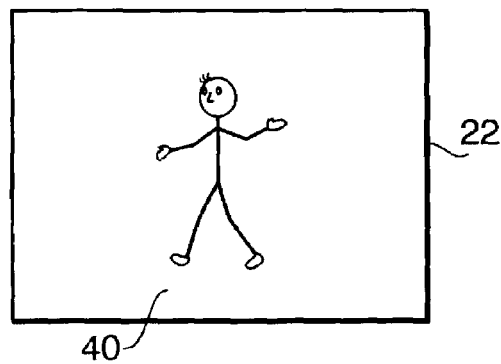
FIGS. 4A through 4J show exemplary images displayed on a LCD monitor of the digital camera of FIG. 1.

At step S116, the image currently captured by the CCD 12 is displayed on the LCD monitor 22, as shown in FIG. 4A, so as to allow the user to frame the object to be taken (this image will be referred hereinafter as first monitor image 40).

Figure 4B:
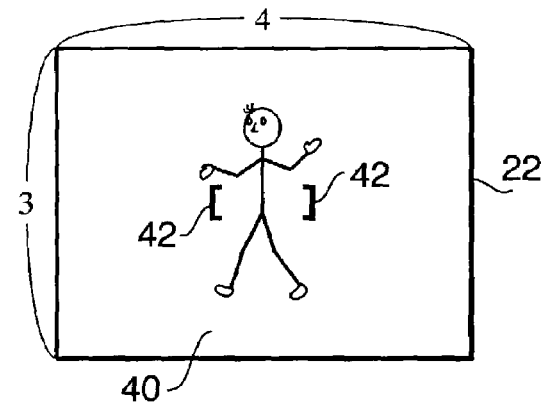

Next, a mark 42 such as "[]" is superimposed on the first monitor image 40 (S118), as shown in FIG. 4B. The mark 42 indicates an automatic focusing zone. That is, the digital camera 10 adjusts the focus of the lens system 11 such that the image of the object located within the mark 42 is sharply formed on the CCD 12.

As shown in FIG. 4B, the LCD monitor 22 has a landscape shape of which length to width ratio is three to four, for example. A normal picture taken by the digital camera 10 also has a landscape shape of which length to width ratio is three to four. Since the picture taken by the digital camera 10 in stereo mode includes a pair of stereo images, i.e., one stereo image on the left half of the picture and the other one stereo image on the right half, each of the stereo images has a portrait shape of which length to width ratio is three to two.

Since the length to width ratio differs between the LCD monitor 22 and the stereo image to be taken, it is difficult to correctly frame the stereo image if the first monitor image 40 is displayed on the LCD monitor 22 in full screen as shown in FIGS. 4A and 4B.

Figure 4C:
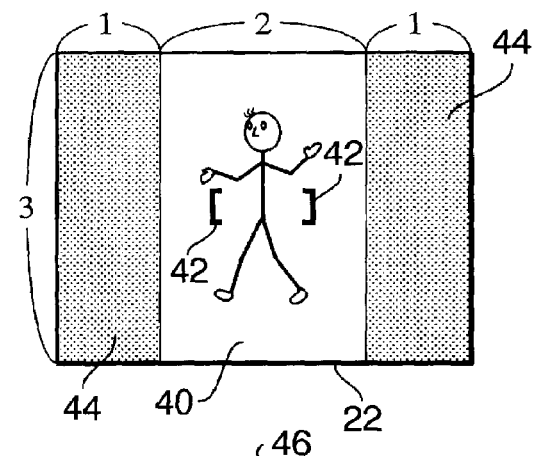

In order to solve the problem above, a mask pattern 44 is superimposed on the first monitor image 40 as shown in FIG. 4C (S120). The mask pattern 44 covers left and right side portions of the first monitor image 40 such that the first monitor image 40 appears only at a center area of which width is the half of the LCD monitor's width, and hence the length to width ratio of the first monitor image 40 becomes equal to that of the stereo image to be taken (i.e., three to two).

Figure 4D:
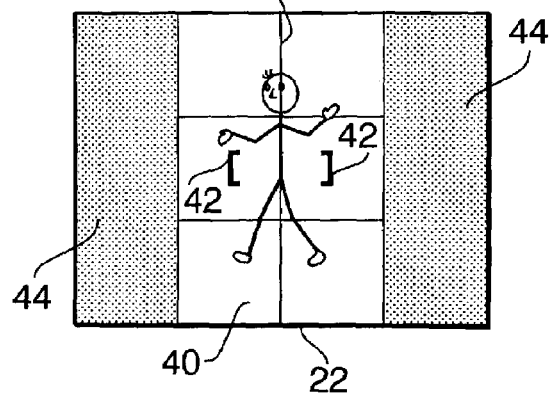

Next, a framing assisting pattern 46 is further superimposed on the first monitor image 40, as shown in FIG. 4D, to facilitate the framing of the image to be taken (S122). In the present embodiment, the framing assisting pattern 46 is a grid pattern having lines parallel to the top and bottom edges of the LCD monitor 22 and lines parallel to the side edges of the LCD monitor 22.

Next, it is determined whether the photometry switch 32 is ON (S124). If the photometry switch 32 is not ON (S124:No), it is further determined whether the selecting switch 29 is ON (S126). If the selecting switch is not ON (S126:NO), then the process returns to step S116 to update the first monitor image 40 on the LCD monitor 22. Thus, the process for updating the first monitor image 40 displayed on the LCD monitor 22 (S116–S112) is repeated as long as the photometry switch 32 is not pressed and the currently selected sub-mode remains the stereo mode. Consequently, a moving image captured by the CCD 12 can be observed on the LCD monitor 22.

If, at step S126, the state of the selecting switch 29 is ON (S126:YES), which indicates either of the program AE mode or the manual mode is selected, the process jumps to step S104 to operate the digital camera 10 in the selected sub-mode.

If, at step S124, the photometry switch 32 is ON (S124: YES), which indicates the shutter button is depressed halfway, photometry and white balance adjustment is carries out based on the image signal from the CCD 12 (S128).

Next, at step S130, automatic focusing is performed. In the present embodiment, automatic focusing is performed by the contrast detection means which is well known in the art. That is, the focusing lens of the lens system 11 is moved to a position where optimum contrast is obtained in the image formed on the CCD 12 at an area thereof corresponding to the automatic focusing zone indicated by the mark 42 superimposed on the first monitor image 40.

Further, at step S130, the distance to the object is determined from the position of the focusing lens. The microprocessor 15 of the present embodiment includes a memory in which a lookup table is stored. The lookup table provides the relation between the focusing lens position and the object distance. The microprocessor 15 determines the object distance from the position of the focusing lens by making reference to the lookup table. The position of the focusing lens is calculated based on the number of pulses provided to a pulse motor that is equipped to the focusing lens driving mechanism 23 for driving the focusing lens.

At step S132, it is determined whether the release switch 31 is ON. In other words, it is determined whether the shutter button of the digital camera 10 is fully depressed or not. If the release switch 31 is not ON (S132:No), the process proceeds to step S126. If the release switch is ON (S132:Yes), an automatic exposure control is carried out (S134).

Next, the first shoot is carried out (S136). That is, a full size still image, which will be referred to hereinafter as first full size image 50, is generated based on the output signal (image signal) of the CCD 12 and stored into the DRAM 16.

At step S138, the first stereo image is generated from the first full size image 50. As shown in FIG. 5, the first stereo image (indicated by reference number 52) is generated by extracting a part of the first full size image 50. The extracted part is the center area of the first full size image 50 and the width of the extracted part is the half of that of the first full size image 50.

Figure 4E:
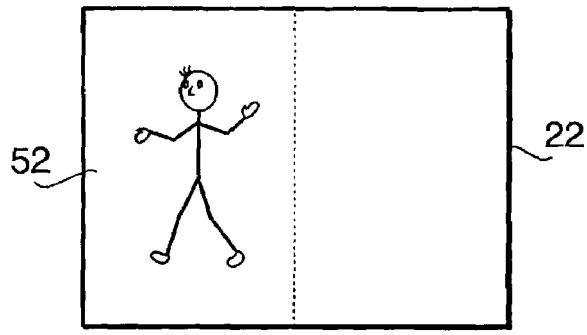

Next, the first stereo image 52 is displayed on the LCD monitor 22 (S140). Since the first stereo image 52 corresponds to the left image of a stereoscopic pair of images, as mentioned before, the first stereo image 52 is displayed on the left half of the LCD monitor 22 as shown in FIG. 4E.

At step 142, the microprocessor 15 calculates the distance for which the digital camera 10 should be laterally moved after the first shoot in order to take the second one of the stereoscopic pair of still images, which will be referred to hereinafter as a second stereo image. The amount of the lateral camera displacement depends on the object distance that is obtained at step S130. Generally, a good stereoscopic effect can be obtained when the digital camera 10 is moved laterally for a distance within the range of 1/30 to 1/60 of the object distance. In the present embodiment, the amount of the camera displacement is determined to be 1/40 of the object distance, which is found to be most appropriate from experiences. For example, if the object distance is 6 m, the amount of the camera displacement is determined to be 15 cm.

Figure 4F:
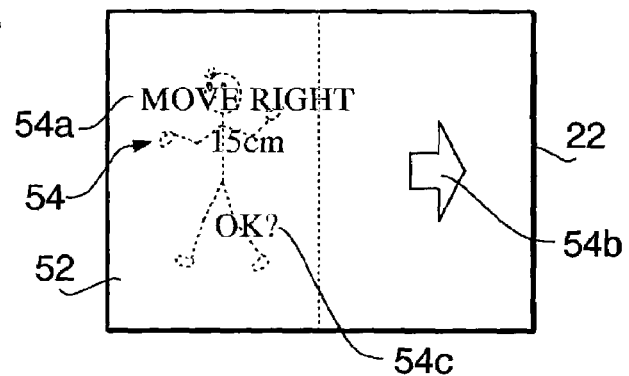

Next, the mark 42, the mask pattern 44 and the framing assisting pattern 46 are eliminated from the LCD monitor 22, and a guide information 54 is superimposed on the LCD monitor 22, as shown in FIG. 4F, for advising the user the camera location suitable for the second shoot (S144). The guide information 54 includes, for example, text 54a indicating the direction and amount of the camera displacement, and an arrow 54b indicating the direction of the camera displacement. In the present embodiment, right direction is indicated by the text 54a and the arrow 54b since the second still image to be taken corresponds to the right image of the stereoscopic pair of images. Further, the guide information 54 includes text and/or a mark 54c that requires the user to depress the determination switch 30 to confirm that the user has seen the guide information 54.

At step S146, it is determined whether the determination switch 30 is ON. If the determination switch 30 is not ON (S146:NO), it is further determined whether the selecting switch 29 is ON (S148). If the selecting switch 29 is not ON (S148:NO), the process returns to step S146. If the selecting switch 29 is ON (S148:YES), the process jumps to step S104.

If, at step S146, the determination switch is ON (S146:YES), which indicates that the user has seen the guide information 54 displayed on the LCD monitor 22 and depressed the determination switch 30, the process proceeds to step S150 to start the operation for shooting the second stereo image (steps S150–S164).

That is, at step 150, the guiding information 54 is removed from the LCD monitor 22.

Figure 4G:
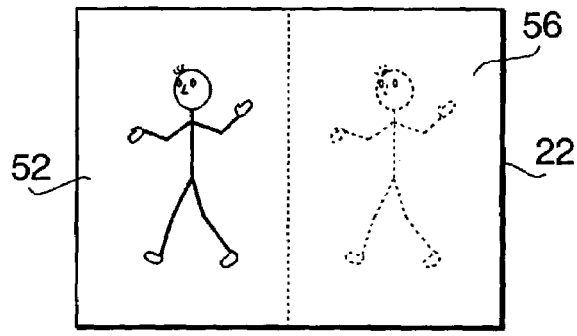

Then, a second monitor image 56 is displayed on the right half of the LCD monitor 22, as shown in FIG. 4G, so as to allow the user to frame the digital camera 10 for the second shoot (S152). Namely, a center part of an image currently captured by the CCD 12 is extracted to get an image of half size in width direction, and displayed on the right half of the LCD monitor 22.

Figure 4H:
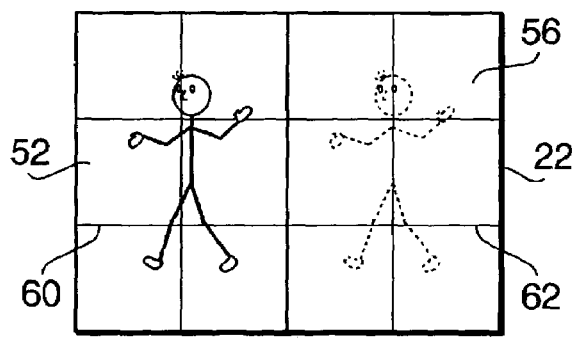

At step S154, framing assisting patterns 60 and 62 are superimposed on the first stereo image 52 and the second monitor image 56, respectively, as shown in FIG. 4H. A line thicker than the lines of the framing assisting patterns 60, 62 is also displayed on the boundary between the first stereo image 52 and the second monitor image 56.

The framing assisting patterns 60 and 62 have the same arrangement as that of the frame assisting pattern 46 superimposed on the first monitor image 40 at step S122. The framing assisting patterns 60 and 62 facilitates the framing of the digital camera 10 so as to locate the object in the second monitor image 56 at substantially the same location as that in the first stereo image 52.

Figure 4I:
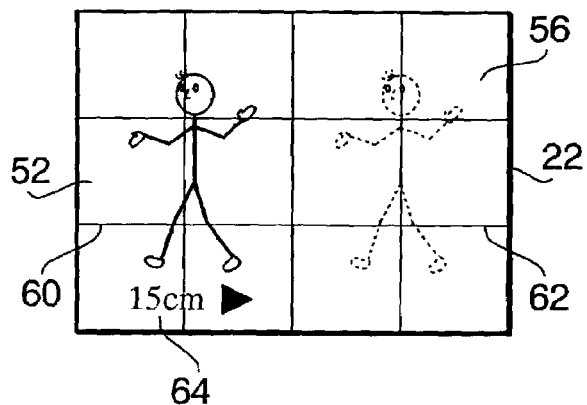

At step S156, a guide information 64 is super imposed on the first stereo image 52 as shown in FIG. 4I. The guide information 64 includes text indicating the amount of camera displacement calculated at step S142 as well as a mark indicating the direction of displacement.

Next, it is determined whether the release switch 31 is ON (S158). In other words, it is determined whether the shutter button is fully depressed. If the release switch 31 is not ON (S158:NO), then it is determined whether the selecting switch 29 is ON (S160). If the selecting switch 29 is ON (S160:YES), the process jumps to step S104. The process, however, returns to step S150 to repeat the steps S150 through S156 if the selecting switch 29 is not ON (S160:NO). In the later case, the monitor image displayed on right half of the LCD monitor 22 is updated by repeating the step S152 and thereby a moving image captured by the CCD 12 can be observed on the LCD monitor 22.

If, at step S158, the release switch 31 is ON (S158:YES), the exposure of the digital camera 100 is adjusted to the same condition as that of the first shoot (S162).

At step S164, the second shoot is carried out. That is, a full size still image, which will be referred to hereinafter as a second full size image, is generated based on the output signal (image signal) of the CCD 12 and stored into the DRAM 16. It should be noted that the shooting conditions (i.e. focusing distance, exposure condition, object distance, condition of white balance etc) is kept the same between the first and second shoots except for the location of the digital camera 10. Accordingly, the automatic focusing, for example, is not performed for the second shoot to keep the focusing lens of the lens system 11 at the position where it was at the time of the first shoot.

At step S166, the second stereo image is generated from the second full size image in a manner similar to generating the first stereo image 52. That is, the second stereo image is generated by extracting a center part of the second full size image of which width is half of the full size image.

Figure 4J:
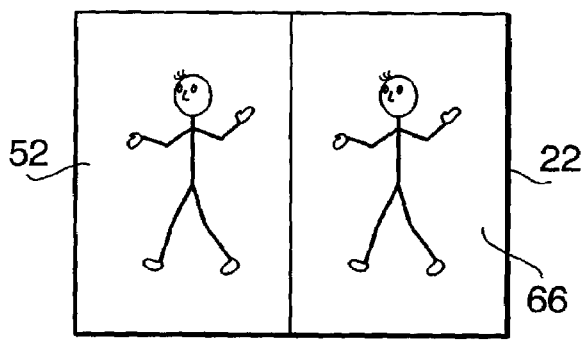

The second stereo image corresponds to the right image of a stereoscopic pair of images. Accordingly, at step S168, the second stereo image obtained as above is displayed on the right half of the LCD monitor 22 as shown in FIG. 4J (see reference number 66).

Next, it is determined whether the variable Smode is "S0" (S170). In other words, it is determined whether the parallel view mode is currently selected. If the variable Smode is "S0" (S170:Yes), a set of data for a stereoscopic image 70 which is to be observed by parallel view method is generated from the first and second stereo images 52, 66 (S172), as schematically illustrated in FIG. 6, and stored into the DRAM 16. That is, an image is generated of which left half is the first stereo image 52 and the right half is the second stereo image 66.

If, at step S170, the variable Smode is not "S0", a set of data for an stereoscopic image 72 which is to be observed by cross view method is generated from the first and second stereo images 52, 66, as schematically illustrated in FIG. 7, and stored into the DRAM 16 (S174). Namely, in the cross view stereoscopic image 72, the first stereo image 52 is located on the right half and the second stereo image 66 on the left half as shown in FIG. 7.

Next, the stereoscopic image 70 for parallel view method or the stereoscopic image 72 for cross view method is compressed (S176) and then stored into the CF card 26 (S178).

Next, an inquiry is displayed on the LCD monitor 22 asking the user whether to continue the stereo mode or not (S180). Then, it is determined whether the determining switch 30 is ON or depressed (S182). If the determining switch 30 is ON (S182:YES), the process returns to step S116 to take the next stereoscopic pair of images. If the determining switch 30 is not ON (S182:NO), then it is determined whether the selecting switch 29 is ON or not (S184). If the selecting switch 29 in not ON (S184:NO), then the process returns to step S180. If, however, the selecting switch 29 is ON (S184:YES), which indicates either the program AE mode or the manual mode is selected instead of the stereo mode, then the process jumps to step S104.

The process shown in FIGS. 3A through 3C terminates when the main switch 27 is turned off or when the mode selecting dial 28 is adjusted to a mode other than recording mode.

As described above, in the digital camera 10 according to the embodiment of the invention, the first stereo image 52 and the second monitor image 56 are displayed on the LCD monitor 22 side by side. Thus, framing of the second image to be taken can be carried out with referring to the composition of the first stereo image 52. It should be noted that the framing can be easily carried out since the framing assisting pattern (60, 62) is superimposed on both of the first stereo image 52 and the second monitor image 56.

It should be also noted that the framing assisting patterns (60, 62) facilitate the detection of the positional difference in up and down direction or tilt between first stereo image 52 and the second monitor image 56 since a grid pattern is used as the framing assisting pattern (60, 62) that consists of lines extended in up and down direction and lateral direction of the LCD monitor 22.

Further, since the framing assisting pattern is also superimposed on the first monitor image 40, the user can aim at a distinctive part of the object with the framing assisting pattern when the first stereo image is to be taken. Then, the user can easily adjust the framing of the second shoot to the composition of the first stereo image by aiming at the same distinctive part of the object with the framing assisting pattern when the second stereo image is to be taken.

It should be noted that although a gird pattern is utilized as the framing assisting pattern in the embodiment describe above, other pattern such as a cross superimposed on the image at the center thereof or an array of a plurality of small crosses or dots may also be utilized as the framing assisting pattern.

The present disclosure relates to the subject matter contained in Japanese Patent Application No. P2002-035013, filed on Feb. 13, 2002, which is expressly incorporated herein by reference in its entirety.

What is claimed is:

1. A digital camera for capturing a first still image of an object and a second still image of the object to generate a stereoscopic pair of images, comprising:
   an imaging device that sequentially captures the first still image of the object and the second still image of the object; and
   a display that displays a moving image captured by said imaging device to monitor the object and a framing assisting pattern superimposed on the moving image to facilitate framing of at least one of the first still image and the second still image prior to the at least one of the first still image and the second still image being captured,
   wherein said display displays the first still image with a framing assisting pattern superimposed thereon beside the moving image after the first still image is captured.

2. The digital camera according to claim 1,
   wherein the framing assisting pattern comprises a grid pattern having at least one line parallel to top and bottom edges of said display and at least one line parallel to side edges of said display.

3. The digital camera according to claim 1,
   wherein said display displays the first still image beside the moving image in a lateral direction of said display.

4. The digital camera according to claim 3,
   wherein said display has a screen with a length greater in the lateral direction than in a direction perpendicular to the lateral direction,
   wherein two areas are defined on the screen by dividing the screen in half along the lateral direction, and
   wherein the first still image is displayed on one of the two areas while the moving image is displayed on another of the two areas.

5. The digital camera according to claim 4,
   wherein the first still image is defined as a partial area of an image captured by said imaging device, and
   wherein said display displays only an area of the moving image captured by said imaging device that corresponds to the first still image before the first still image is captured.

6. The digital camera according to claim 1,
   wherein said display displays the first still image and the moving image in substantially the same size.

7. The digital camera according to claim 1, further comprising:
   a memory that stores the first still image and the second still image as a single set of data for generating a picture suitable for observing a stereoscopic view by a parallel view method.

8. The digital camera according to claim 1 further comprising:
   a memory that stores the first still image and the second still image as a single set of data for generating a picture suitable for observing a stereoscopic view by a cross view method.

9. A digital camera for capturing a first still image of an object and a second still image of the object to generate a stereoscopic pair of images, comprising:
   an imaging device that sequentially captures the first still image of the object and a moving image of the object;
   a memory that stores the first still image captured by said imaging device; and
   a display that simultaneously displays the first still image beside the moving image, said display displaying the moving image captured by said imaging device and a framing assisting pattern superimposed on the moving image to frame a second still image to be captured and to display a location of the object within the moving image, and said display superimposing a framing assisting pattern on the first still image to display a location of the object within the first still image.

10. The digital camera according to claim 9,
    wherein said display displays the still image beside the moving image in a lateral direction of said display.

11. The digital camera according to claim 10,
    wherein said display displays the still image and the moving image in substantially the same size.

12. The digital camera according to claim 9,
    wherein the framing assisting pattern comprises a grid pattern having at least one line parallel to top and bottom edges of said display and at least one line parallel to side edges of said display.

13. A method of displaying images on a display of a digital camera that is adapted to sequentially capture a first still image of an object and a second still image of the object to generate a stereoscopic pair of images, the method comprising:

displaying a moving image of the object on said display with a framing assisting pattern superimposed on the moving image to facilitate framing of at least one of the first still image and the second still image prior to the at least one of the first still image and the second still image being captured;

displaying the first still image beside the moving image after the first still image is captured; and superimposing a framing assisting pattern on the first still image after the first still image is captured.

14. The method according to claim 13,
wherein the first still image and the moving image are displayed in substantially the same size.

15. The method according to claim 13,
wherein the first still image is displayed beside the moving image in a lateral direction of said display.

16. The method according to claim 13,
wherein said display has a screen with a length greater in the lateral direction than in a direction perpendicular to the lateral direction,
wherein two areas are defined on the screen by dividing the screen in half along the lateral direction, and
wherein the first still image is displayed on one of the two areas while the moving image is displayed on another of the two areas.

17. The method according to claim 13, further comprising:

superimposing the framing assisting pattern on the moving image before the first still image is captured.

18. The method according to claim 13,
wherein the framing assisting pattern comprises a grid pattern having at least one line parallel to top and bottom edges of said display and at least one line parallel to side edges of said display.

* * * * *